Aug. 4, 1931.  E. W. HIMBERGER  1,817,312
BUOY LIGHT
Filed April 14, 1930   2 Sheets-Sheet 1
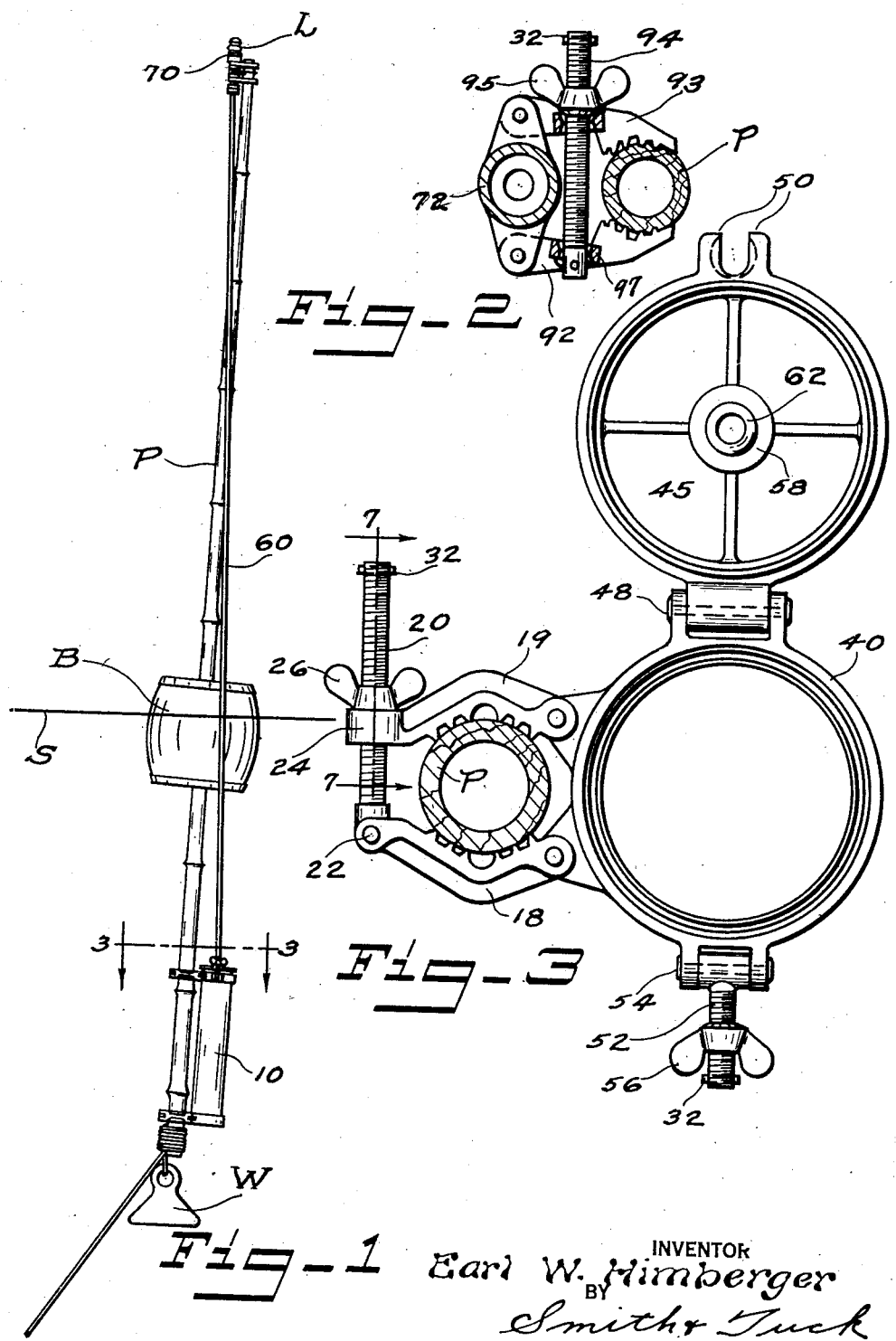
INVENTOR
Earl W. Himberger
BY
Smith & Tuck
ATTORNEYS

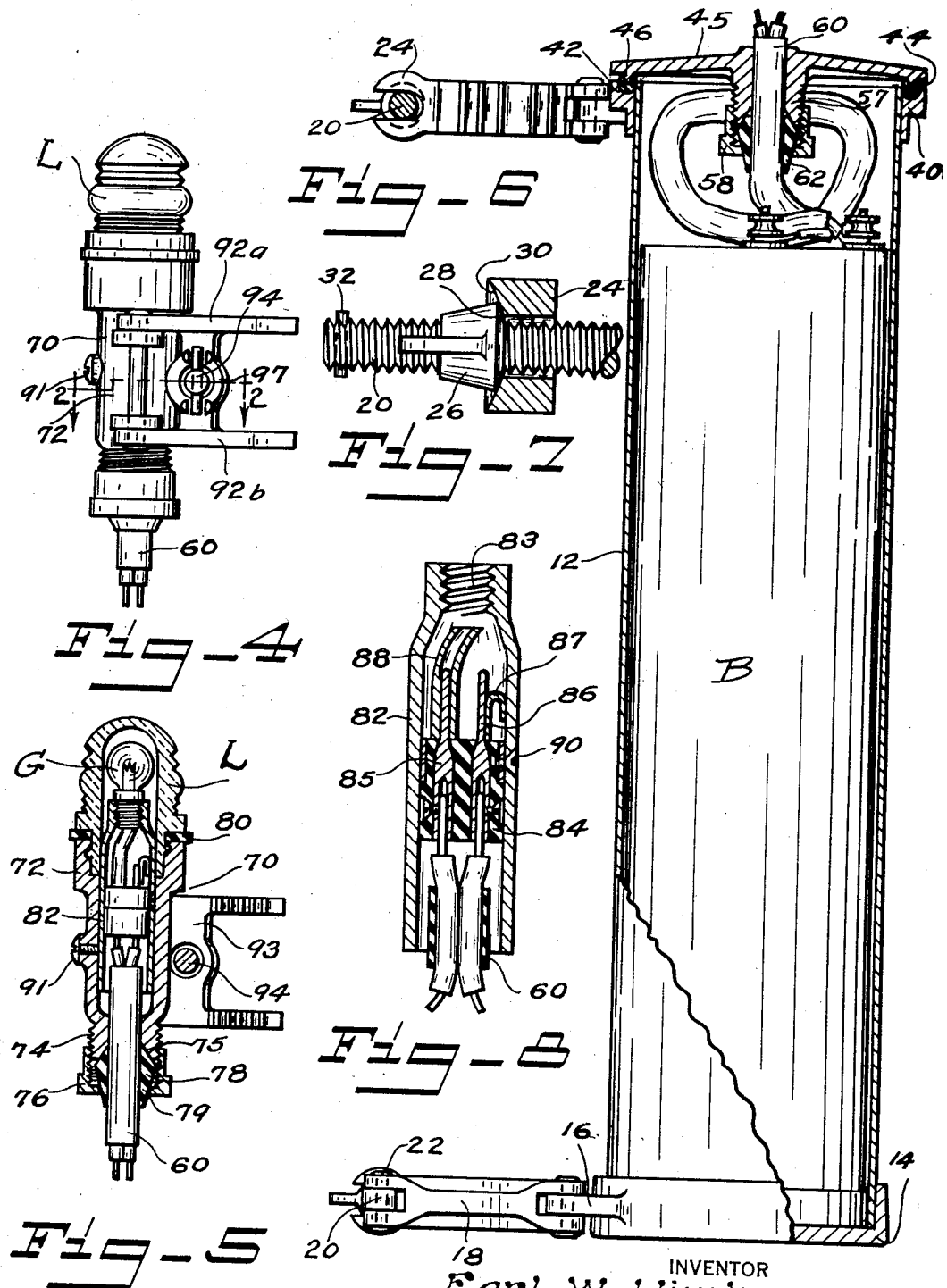
Aug. 4, 1931.   E. W. HIMBERGER   1,817,312
BUOY LIGHT
Filed April 14, 1930   2 Sheets-Sheet 2
INVENTOR
Earl W. Himberger
BY
Smith & Tuck
ATTORNEYS Patented Aug. 4, 1931

1,817,312

UNITED STATES PATENT OFFICE

EARL W. HIMBERGER, OF SEATTLE, WASHINGTON, ASSIGNOR TO PACIFIC MARINE SUPPLY COMPANY, OF SEATTLE, WASHINGTON, A CORPORATION OF WASHINGTON

BUOY LIGHT

Application filed April 14, 1930. Serial No. 444,241.

My present invention relates to the art of signal lights, and more particularly to that type of light which, because of its design, is of particular use in marine work for marking the ends of fishing gear, anchor buoys and similar uses, and which is normally referred to as a buoy light.

In marine practice, particularly in the fishing industry, it is often necessary to leave set lines, or set nets for a period of fishing and it is very desirable to be able to pick up such equipment at night, and further, particularly with the set net, usually a gill net, it is necessary to have a signal light thereon to warn shipping of the presence of such equipment.

In my present device I have endeavored to provide a signal light for such uses that will be of such construction that it will give unfailing service and yet will be sturdy, and the various elements so designed that the equipment can easily be put into use even though the weather be cold and the user wearing gloves on fingers which may be partially numb with cold. I have also found it necessary to have the various pieces of my equipment so securely attached one to another, that no part can be loosened and dropped. This is a big advantage over the numerous lights now in use which employ loose pieces which are constantly being dropped overboard and lost, thus making the balance of the equipment of no use, therefore:

The principal object of my invention is to provide a signal or buoy light which, by virtue of its construction, cannot be made inoperative by water or weather conditions.

A further object is to provide a buoy light which may be quickly and securely installed without the aid of auxiliary means such as lashing and so forth.

A further object is to provide a buoy light in which all the various items making up the whole are so securely secured one to another that no single essential part can be lost.

Other and more specific objects will be apparent from the following description taken in connection with the accompanying drawings, wherein:

Figure 1 is an elevation of my device as installed upon a fishing gear buoy.

Figure 2 is a top plan view of the light holding element of my device.

Figure 3 is a cross-sectional view along the line 3—3 of Figure 1 except that the cover of the battery compartment is shown in its opened position.

Figure 4 is a side elevation of my light holding member.

Figure 5 is a cross-sectional view of Figure 4.

Figure 6 is an elevation of my battery compartment certain parts being shown in section to illustrate the construction.

Figure 7 is a cross-sectional view taken along the line 7—7 of Figure 3 and is typical of all wing nut engagements.

Figure 8 is a cross-sectional view on enlarged scale of the globe holding tube.

Referring to the drawings throughout which like reference numerals indicate like parts, numeral 10 designates my battery compartment which is adapted to house a suitable battery B. This consists of a tubular body 12 which is normally of salt water resistent material. Closing the lower end of tube 12 is a base member 14. Pivotaly secured to lugs 16, formed as part of the base, are clamp members 18 and 19. These members are identical with the upper clamp members, which are quite clearly shown in plan view in Figure 3. These are preferably curved or V shaped so as to more easily encircle the pole "P" of the buoy. These members are adapted to be clamped about shaft "P" by a swinging bolt 20, which is pivotally secured at one end by pivot 22 in member 18. The corresponding end of member 19 is yoke shaped as shown at 24, in Figure 6 particularly. A wing nut 26 is used as a matter of convenience, and has its engaged surface 28 rounded to engage a similarly cupped surface 30. This arrangement is desirable as it prevents the wing nut 26 slipping out of engagement with yoke 24, should it be accidentally struck, and is used throughout my device wherever wing nuts are used.

I have further provided at the end of bolt 20 a retaining pin 32. This prevents any possibility of losing wing nut 26.

The upper end of tube 12 may be closed by any water tight joint which may be easily opened. I have indicated that type of closure which is used in closing port holes of boats and consists of a gasket retaining member 40 which is secured to the end of tube 12. This carries an annular groove 42 in which is seated any suitable type of gasket 44. I have illustrated a semi-circular form of groove which is very satisfactory. An annular flange, or pressing ring 46 formed as part of cover 45 is provided to fit within the groove 42 and to sit tightly upon the gasket contained therein. A form of gasket that has proven very satisfactory in use is made of rubber with a circular cross-section. The annular pressing ring 46 is preferably given a a V shaped cross-section so it will imbed itself in the soft rubber and cause it to swell outwardly. This provides a very secure water-tight joint without much pressure being necessary. Cover 45 is hingedly secured to base 40 by the hinge member 48.

Diametrically opposite the hinge point are two lugs 50, formed as part of cover 45, which form a yoke. When the cover is placed in the closed position these lugs are adapted to be engaged by the cover securing bolt 52, which is hinged to member 40 at 54. Wing nut 56 is provided and has a retaining pin 32, to prevent its being lost. Formed preferably on the inner surface of cover 45 is a stuffing box which is intended to prevent the entrance of water along the electric cable 60. I have found that when this stuffing box is inside the battery compartment it is much less apt to be damaged than were it outside of the same. The stuffing box consists of an inwardly extending boss 57, gland nut 58 adapted to be screwed onto the same and a rubber compression member 62 which is formed with two oppositely sloping surfaces as though two truncated cones were placed base to base. This double cone arrangement has proven very satisfactory and is also used on the light holding member to be described later.

On the battery compartment I have found it very desirable to have two sets of clamp members 18 and 19 as this two point contact gives the most rigid construction, although I believe it will be apparent that the construction shown in Figure 4 might be enlarged and used successfully.

Referring to Figure 4 I have illustrated the light carrying member 70. This consists of the body member 72, which I normally prefer to make of some salt water resisting material such as brass. At the lower end of member 72 I have provided a stuffing box similar to that used in the cover of the battery compartment, and which consists of the externally threaded member 74, and internally threaded gland member 76, and a resilient packing member 78. This is provided as in the other case with a rather steep tapered portion 75, and a more tapering portion 79. This more gradual taper is desirable in that it can be used to extend outwardly beyond the gland member 76 and when the same is tightened will bind very snugly about the cable 60.

At the upper end of the body member I have provided a lens member "L". This I normally prefer to have the same general shape characteristic of marine lights and which is normally referred to as a "Fresnal" lens. This lens I normally screw into place upon a gasket member 80, to the end of securing a water tight joint. Suitably positioned within lens "L" is an electric light globe "G". This is secured within the globe holding tube 82 which is more clearly illustrated in the enlarged view of Figure 8, wherein a threaded portion 83 is provided into which the globe "G" is screwed. This form of contact, while not essential, is desirable in that it enables one to keep the size of lens "L" down to a minimum. After leaving the threaded portion, tube 82 is swelled out to accommodate the electric cable terminals of cable 60. I have indicated a terminal block 84 which should be of rubber, bakelite or other non-conductive material into which has been inserted the metal contact members 85 and 86. The wires forming cable 60 may be secured to these metal members in any convenient manner, such as the set screws illustrated.

Contact 86 has secured to it the spring contact 87, which serves to ground this member to the metal tube and this in turn engages the threaded outside contact of the globe at 83. Member 85 is provided with an upwardly extending contact member for which I have used a piece of hollow tubing 88. This is so positioned as to engage the central contact member of globe "G" and thus provide a complete electric circuit. The contact block 84 is secured in proper relationship to globe "G", by the set screw 90. The globe holding tube 82 is adjustably secured in member 72 by the set screw 91. I have found it very desirable to have a quick method of attaching my light carrying member 70 to the upper end of the buoy pole or to any signal staff, which in addition to being quick acting should maintain member 70 in fixed longitudinal relationship with the supporting staff or pole. To this end I have provided clamp members 92 and 93 which are pivotably supported from member 70, and are so constructed that each of the clamp members have an upper and lower jaw as 92A and 92B. This spacing of the jaw members of a single clamp member gives a very rigid attaching means which will at all times hold members 70 with its axis parallel to the axis of its supporting staff. As a clamping means I have provided a single clamp bolt 94 provided with a wing nut 95 and securing pin 32. I have found it desirable to either roughen the inner surface of all my clamp members or to provide them with the teeth as are shown in Figures 3 and 6, and 2 and 5.

*Method of operation*

In operating my device my light holding member 70 is clamped preferably at the very top of the buoy pole so it will be visible from all directions. This may be accomplished by loosening wing nut 95. As the holes in web members 97 are considerably relieved the clamp members 92 and 93 can be swung away from each other to a considerable extent and thus be made to pass over the end of pole "P". The wing nut is then tightened and member 70 is securely attached to the pole.

I then prefer to attach member 10 by means of the two sets of clamps 18—19 at the lowermost end of pole "P". When attached in this manner the battery and battery compartment member make their weight available as an anchoring means or weight to maintain the pole in an upright position. If necessary an additional weight "W" may be used to supplement 10 if the pole "P" is very long. The pole normally will have either a buoy member as "B" resting on the surface of the water "S", or as is quite often employed, will have a string of corks attached at this point, to give buoyancy to the entire device. As my battery compartment has been constructed with special attention paid to its water tight construction it cannot be damaged by immersing the same in this manner.

The electric light cable 60 must also be chosen for this type of service. I have found the very heavy round rubber insulated type to be the most satisfactory, its heavy insulation making it water proof, of course, and the round section making it possible to seal the joints where I have attached the two stuffing boxes.

The foregoing description and the accompanying drawings clearly disclose a preferred embodiment of my invention but it will be understood that this disclosure is merely illustrative and that such changes in the invention may be made as are fairly within the scope and spirit of the following claims:

What I claim is:

1. A buoy light comprising a light carrying member adapted to be clamped onto a buoy shaft, clamp means for said light carrying member consisting of two coacting clamp members pivotably secured to said carrying member and adapted to be secured in clamping relationship by a clamp bolt which passes through said clamp members; a watertight battery compartment also adapted to clamp onto a buoy shaft and a length of waterproof electric cable connecting said light carrying member and the battery compartment.

2. A buoy light comprising a light carrying member adapted to be clamped onto a buoy shaft, a watertight battery compartment adapted to be clamped onto a buoy shaft by spaced clamp members, a gasket retaining member, a yieldable gasket disposed within said member; a hinged cover secured to said gasket retaining member, a yoke member on said cover, a clamp bolt hingedly secured to said retaining member and adapted to coact with said yoke to secure the hinged cover in its closed position and a length of water proof electric cable connecting said light carrying member and the battery compartment.

3. A buoy light comprising a light carrying member adapted to be clamped onto a buoy shaft, clamp means for said light carrying member consisting of two coacting clamp members pivotably secured to said carrying member and adapted to be secured in clamping relationship by a clamp bolt which passes through said clamp members; a watertight battery compartment adapted to be clamped onto a buoy shaft by spaced clamp members, a gasket retaining member, a yieldable gasket disposed within said member; a hinged cover secured to said gasket retaining member, a yoke member on said cover, a clamp bolt hingedly secured to said retaining member and adapted to coact with said yoke to secure the hinged cover in its closed position and a length of water proof electric cable connecting said light carrying member and the battery compartment.

4. A buoy light comprising a light carrying member adapted to be clamped onto a buoy shaft, clamp means for said light carrying member consisting of two coacting clamp members pivotably secured to said carrying member and adapted to be secured in clamping relationship by a clamp bolt which passes through said clamp members; said light carrying member consisting of a body member having secured to its upper end a hollow lens adapted to project light in a horizontal plane, an electric light globe, an adjustable globe holding tube disposed within said body member and a terminal block adjustably secured within said tube; an electric battery; a watertight battery compartment also adapted to clamp onto a buoy shaft and a length of waterproof electric cable connecting said light carrying member and the battery compartment.

5. A buoy light comprising a light carrying member adapted to be clamped onto a buoy shaft, clamp means for said light carrying member consisting of two coacting clamp members pivotably secured to said carrying member and adapted to be secured in clamping relationship by a clamp bolt which passes through said clamp members; a watertight battery compartment adapted to be clamped onto a buoy shaft by spaced clamp members;

a gasket retaining member, a yieldable gasket disposed within said members; a hinged cover secured to said gasket retaining member, a yoke member on said cover, a clamp bolt hingedly secured to said retaining member and adapted to coact with said yoke to secure the hinged cover in its closed position; a length of water proof electric cable connecting said light carrying member and the battery compartment; and stuffing boxes consisting of a boss having a coned counter base in its outer end, a gland nut adapted to adjustably engage said boss and having a coned counter-bore in its outer end and a yieldable compression member having coned surfaces adapted to coact with both of said coned counter-bores to produce a water tight joint where said cable enters the battery compartment and the light holding member.

6. A buoy light comprising a light carrying member adapted to be clamped onto a buoy shaft, clamp means for said light carrying member consisting of two coacting clamp members pivotably secured to said carrying member; said clamp members being each provided with an upper and a lower jaw member, a single clamp bolt adapted to pass through the clamp members between the upper and lower jaws at a point between the grip portions of the jaws and their pivots and secure them in clamping relationship; a watertight battery compartment adapted to be clamped onto a buoy shaft by spaced clamp members, a gasket retaining member, a yieldable gasket disposed within said member; a hinged cover secured to said gasket retaining member, a yoke member on said cover, a clamp bolt hingedly secured to said retaining member and adapted to coact with said yoke to secure the hinged cover in its closed position and a length of water proof electric cable connecting said light carrying member and the battery compartment.

7. A buoy light comprising a light carrying member adapted to be clamped onto a buoy shaft, clamp means for said light carrying member consisting of two coacting clamp members pivotably secured to said carrying member and adapted to be secured in clamping relationship by a clamp bolt which passes through said clamp members; a watertight battery compartment adapted to be clamped onto a buoy shaft by clamp members, said clamp means consisting of spaced pairs of clamp members, each clamp members being pivotally secured to the battery compartment, a swinging bolt pivotably secured to one of said clamp members and adapted to engage the yoke end of the companion clamp member, a gasket retaining member, a yieldable gasket disposed within said member; a hinged cover secured to said gasket retaining member, a yoke member on said cover, a clamp bolt hingedly secured to said retaining member and adapted to coact with said yoke to secure the hinged cover in its closed position and a length of water proof electric cable connecting said light carrying member and the battery compartment.

8. A buoy light comprising a light carrying member adapted to be clamped onto a buoy shaft, clamp means for said light carrying member consisting of two coacting clamp members pivotably secured to said carrying member and adapted to be secured in clamping relationship by a clamp bolt which passes through said clamp members; a watertight battery compartment adapted to be clamped onto a buoy shaft by clamp members, said clamp means consisting of spaced pairs of clamp members, each clamp members being pivotably secured to the battery compartment, a swinging bolt pivotably secured to one of said clamp members and adapted to engage the yoke end of the companion clamp members, a yoke end on one of each pair of clamp members having its nut engaging surface dished inwardly and an adjusting nut having an outwardly dished engaging surface coacting with the similar surface in the clamp member to secure said members in secure engagement with each other, a gasket retaining member, a yieldable gasket disposed within said member; a hinged cover secured to said gasket retaining member, a yoke member on said cover, a clamp bolt hingedly secured to said retaining member and adapted to coact with said yoke to secure the hinged cover in its closed position and a length of water proof electric cable connecting said light carrying member and the battery compartment.

In witness whereof, I hereunto subscribe my name this 2nd day of April, A. D. 1930.

EARL W. HIMBERGER.